(12) United States Patent
Zhang et al.

(10) Patent No.: US 12,341,751 B2
(45) Date of Patent: Jun. 24, 2025

(54) WHITE LIST-BASED CONTENT LOCK FIREWALL METHOD AND SYSTEM

(71) Applicant: INSTITUTE OF COMPUTING TECHNOLOGY, CHINESE ACADEMY OF SCIENCES, Beijing (CN)

(72) Inventors: Wenli Zhang, Beijing (CN); Wenkai Wan, Beijing (CN); Mingyu Chen, Beijing (CN)

(73) Assignee: INSTITUTE OF COMPUTING TECHNOLOGY, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/773,166

(22) PCT Filed: Jun. 4, 2021

(86) PCT No.: PCT/CN2021/098312
§ 371 (c)(1),
(2) Date: Apr. 29, 2022

(87) PCT Pub. No.: WO2022/001577
PCT Pub. Date: Jan. 6, 2022

(65) Prior Publication Data
US 2025/0133060 A1    Apr. 24, 2025

(30) Foreign Application Priority Data

Jun. 29, 2020    (CN) .......................... 202010606191.1

(51) Int. Cl.
*H04L 9/40*        (2022.01)
*G06F 40/30*       (2020.01)
*H04L 69/22*       (2022.01)

(52) U.S. Cl.
CPC .......... *H04L 63/0245* (2013.01); *G06F 40/30* (2020.01); *H04L 69/22* (2013.01)

(58) Field of Classification Search
CPC ...... H04L 63/0245; H04L 69/22; G06F 40/30
See application file for complete search history.

(56) References Cited

U.S. PATENT DOCUMENTS 8,886,580 B2 * 11/2014 Grenier .................... G06F 16/35
707/811
9,774,626 B1 * 9/2017 Himler ................ H04L 63/1483
(Continued)

FOREIGN PATENT DOCUMENTS

| CN | 103825900 A | 5/2014 |
| CN | 106131090 A | 11/2016 |

(Continued)

OTHER PUBLICATIONS

International Search Report and Written Opinion Application No. PCT/CN2021/098312, dated Aug. 19, 2021, 12 pages.

(Continued)

*Primary Examiner* — Richard G Keehn
(74) *Attorney, Agent, or Firm* — Zhong Law, LLC

(57) ABSTRACT

A content lock firewall method based on a white list includes performing semantic parsing on the payload of a data packet received by a website to obtain parsed texts of the received data packet, and matching the parsed texts of the data packet received by the website with a text pattern library to decide whether to forward or intercept the received data packet, the text pattern library comprising a plurality of text patterns, and each text pattern includes a sequence of keywords and a value range of each keyword. For the website with a relatively fixed function, through deployment of the firewall, known and new network attacks may be effectively defended, and the website may run with vulnerability under (Continued)

the condition of ensuring normal functions, without expensive upgrading.

11 Claims, 2 Drawing Sheets

(56) References Cited

U.S. PATENT DOCUMENTS

| | | | |
|---|---|---|---|
| 9,973,507 B2 | 5/2018 | Kadur et al. | |
| 10,235,358 B2* | 3/2019 | Tur | G06F 40/30 |
| 10,922,363 B1* | 2/2021 | Paiz | H04L 67/02 |
| 11,423,018 B1* | 8/2022 | Paiz | G06F 16/243 |
| 2010/0274823 A1* | 10/2010 | Sathish | H04L 69/08 |
| | | | 707/E17.014 |
| 2011/0087781 A1* | 4/2011 | Kim | H04L 63/1441 |
| | | | 709/225 |
| 2017/0010829 A1* | 1/2017 | Chen | G06F 3/0673 |
| 2017/0302626 A1 | 10/2017 | Yan et al. | |
| 2018/0041530 A1* | 2/2018 | Tang | H04L 63/1425 |
| 2018/0276295 A1* | 9/2018 | Abou Mahmoud | G06F 40/30 |
| 2019/0188199 A1* | 6/2019 | Nie | G06Q 30/0257 |
| 2019/0272071 A1* | 9/2019 | Greenberger | G06F 40/30 |
| 2020/0073983 A1* | 3/2020 | Sen | G06F 16/243 |
| 2023/0095006 A1* | 3/2023 | Riva | G06F 40/30 |
| | | | 715/762 |

FOREIGN PATENT DOCUMENTS

| | | |
|---|---|---|
| CN | 107622333 A | 1/2018 |
| CN | 108898015 A | 11/2018 |
| CN | 109347846 A | 2/2019 |
| CN | 110290148 A | 9/2019 |
| CN | 110336782 A | 10/2019 |
| CN | 110661680 A | 1/2020 |
| CN | 111770097 A | 10/2020 |

OTHER PUBLICATIONS

Chinese Search Report received in Application No. 2020106061911, dated Jan. 25, 2021, 2 pages.
Chinese Search Report received in Application No. 2020106061911, dated Mar. 19, 2021, 2 pages.
Wen Li et al., Self Learning Method for Industrial Firewall Rules Based on Hash Algorithm, Computer Engineering and Design, vol. 37, No. 3, Mar. 2016, pp. 1-5.

* cited by examiner

WHITE LIST-BASED CONTENT LOCK FIREWALL METHOD AND SYSTEM

CROSS-REFERENCE TO RELATED APPLICATIONS

This application is the U.S. national stage of PCT/CN2021/098312 filed Jun. 4, 2021, which claims priority benefit to Chinese Patent Application No. 202010606191.1 filed Jun. 29, 2020. The contents of the above-mentioned applications are hereby incorporated by reference in their entireties.

TECHNICAL FIELD

The present disclosure relates to the field of network security, and in particular to the field of a firewall.

BACKGROUND

A firewall is a main tool for website security protection. The firewall may be functionally classified as packet filtering firewalls and content filtering firewalls. The packet filtering firewalls are widely used in uncomplicated networks because they are relatively fast to check only packet header information specified according to the Internet Protocol (IP) and Transmission Control Protocol (TCP). The major problem of the packet filtering firewalls is the inability to verify content of the data packet. The content filtering firewalls can filter the content of the data packet, and the detected content may be Uniform Resource Locator (URL) address, feature code, etc. Each web page and its resources on the Internet are uniquely identified by a URL. Through URL filtering, a URL field in a user HTTP connection GET/POST request is extracted, and the validity of the URL is determined whether to forward or to intercept a Hyper Text Transfer Protocol (HTTP) request packet. In general, a content filtering firewall manufacturer uses the big data technology to analyze and learn malicious traffic to obtain a malicious traffic detection model library, and uses the library to filter access traffic. Such a technical solution has the advantages of appending a new malicious traffic detection model, and the accuracy of network malicious traffic detection is effectively improved. The disadvantage is that during the time delay between the occurrence of a new network attack and the establishment an updated model, the attack cannot be intercepted.

In addition, a vulnerability attack on a specific website cannot be effectively learned by using the big data technology. System vulnerability reparation has been a problem that a Web application has to face. For the problem of system vulnerability, in addition to regularly upgrading the system software, another solution is to scan its website vulnerability by using scanning software. But the website vulnerability scanning software mostly often is expensive. Platform scanning is another solution emerging in recent years. A website should be submitted to a platform for authentication, and after authentication, a scanning result is sent to a user through e-mail in the form of a vulnerability list. The above solutions are only to find website vulnerability which still needs professionals to repair the vulnerability after it is found. Furthermore, more than one third of the Web application vulnerabilities reviewed by Imperva have no available solutions.

Selection of the firewall for the website needs to take into consideration factors including its traffic, service targets, content sensitivity and maintenance costs, etc. Most websites (e.g., the official websites of universities and enterprises and institutions, and the web portals of some small companies) have relatively low demands for updating their functions. About 68.3% of the websites are updated only once in more than 6 months according to the statistics. Such websites are generally unwilling or unable to afford the high costs of professional maintenance, and are protected by using simple firewalls, thereby exposing the website to the risk of being attacked.

SUMMARY

A firewall filtering rule may be classified into a white list type and a black list type. The white list means that traffic matching the rule will be forwarded, and the black list means that the traffic matching the rule will be intercepted. In general, a packet filtering firewall uses both the white list and the black list, and a content filtering firewall typically mainly uses the black list. The primary problem of a conventional firewall is that the black list is incomplete. Even if a learning rule library is constantly updated, the possibility of an unknown class attack still exists, and the maintenance cost of the black list is high.

In order to solve the problem, the present disclosure provides a content lock firewall method and system based on a white list, including the following aspects.

According to the first aspect of the present disclosure, a content lock firewall method based on a white list is provided, including:
  S200: performing semantic parsing on the payload of a data packet received by a website to obtain parsed texts of the received data packet; and
  S300: matching the parsed texts of the data packet received by the website with a text pattern library to decide whether to forward or intercept the received data packet, the text pattern library including a plurality of text patterns, and each text pattern includes a sequence of keywords and a value range of each keyword.

In one embodiment of the present disclosure, wherein the text pattern library is generated according to the following step:
  performing semantic parsing on the payload of each data packet from existing normal traffic of the website, and training with the parsed text to obtain a sequence of keywords and a value range of each keyword.

In one embodiment of the present disclosure, wherein the text pattern library may also be customized, for example, designed directly by the programmer.

In one embodiment of the present disclosure, wherein S200 further includes: performing the semantic parsing on the payload of the data packet received by the website to obtain the sequence of keywords and the value range of each keyword, and appending the obtained text features to the text pattern library; and
  S300 further includes:
  matching the value range of each keyword and the sequence of keywords of all the parsed texts of the received data packets with the text pattern library one by one, if all the parsed texts are correctly matched, then the matching succeeds, otherwise, the matching fails;
  if the matching succeeds, forward the received data packet; and
  if the matching fails, intercept the received data packet and write the received data packet to an interception log.

In one embodiment of the present disclosure, the generation of the text pattern library includes:

S110, preprocessing normal traffic;

S120, parsing the payload according to the keywords to obtain the parsed text;

S130, classifying a large number of obtained parsed texts according to specific rules, the classification rules including web page URLs and payload keywords, and training with each class of the parsed text to obtain the value range of each keyword and the sequence of keywords; and S140, aggregating the value range of each keyword and the sequence of keywords of all the parsed texts to generate a text feature library, and converting the text features in the text feature library into text patterns one by one to generate the text pattern library.

In one embodiment of the present disclosure, the method further includes step S400:

rechecking the interception log, wherein the interception log is rechecked through counter triggering or at fixed time interval.

In one embodiment of the present disclosure, S400 further includes:

for the data packet which belongs to normal access but being intercepted, parsing the payload of the intercepted data packet to obtain the value range of each keyword and the sequence of keywords, and appending the obtained text features to the text pattern library.

In one embodiment of the present disclosure, wherein the counter triggering includes the following operations:

cumulatively counting the number of the intercepted packets using a count; when the counter exceeds a set threshold, triggering a warning notice to prompt to view the interception log; and then resetting the counter.

According to a second aspect of the present disclosure, a computer-readable storage medium having one or more computer programs stored therein is provided. The computer program is executed to implement the content lock firewall method based on a white list of the present disclosure.

According to a third aspect of the present disclosure, a computing system is provided, including:

a storage device, and one or more processors, wherein the storage device is used for storing one or more computer programs, and a computer program is executed by the processor to implement the content lock firewall method based on a white list of the present disclosure.

Compared with the state of the arts, the embodiment of the present disclosure has the following advantages: known and new network attacks may be effectively defended by taking the normal traffic as training samples to generate the text pattern library. Whether the text content of the whole data packet is consistent with the text pattern library is taken as a detection condition instead of only using URLs or some feature code, thereby preventing attackers from using the blind spot of detection conditions to launch attacks. The exploration of system vulnerabilities of the website itself is generally not normal access behavior and does not conform to the text pattern library, which can be filtered out directly. Compared with a conventional firewall, the solution does not need to maintain a blacklist library at a high cost, and can defend new network attacks mode. For the website developed by a third party which is difficult to update, through deployment of the firewall, the website may run with vulnerabilities under the condition of ensuring its normal function, without expensive upgrading.

BRIEF DESCRIPTION OF THE DRAWINGS

The accompanying drawings which are incorporated in and constitute a part of this specification illustrate embodiments consistent with the present disclosure and, together with the specification, serve to explain the principle of the present disclosure. Obviously, the drawings described below are only some embodiments of the disclosure. Other drawings may further be obtained by those skilled in the art according to these drawings without creative work. In the drawings.

DETAILED DESCRIPTION

Figure 1:
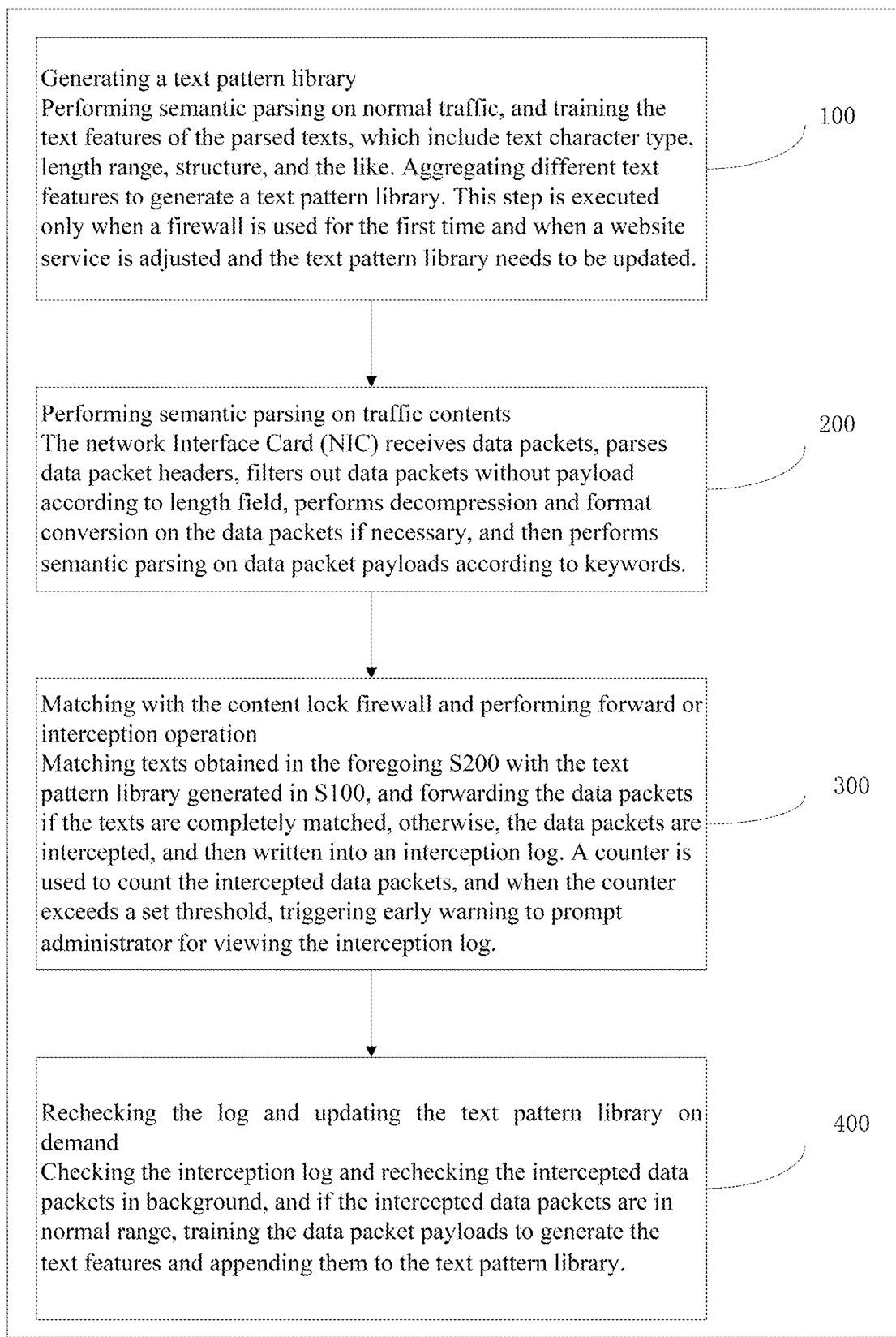
FIG. 1 shows a processing flow chart of one embodiment according to the present disclosure.

As described in the background, the conventional firewall technology has problems of slow response or relatively high maintenance costs, so that a more convenient and fast method is needed. To this end, the applicant proposes a data packet filtering method on content lock based on white list, which takes a text pattern library as the white list and allows only trusted text content to forward through the firewall. According to the method, through utilizing the characteristics that normal traffic content of a website has certain regularities, text parsing, training and learning are performed on the normal traffic content to generate the text pattern library. Only data packets completely matched with the text pattern library are allowed to forward through the firewall in a content detection process. Background rechecking is performed on unmatched data packets, and the text pattern library is updated as required to prevent wrong interception. FIG. 1 shows a flow chart of one embodiment of the method, including S100, S200, S300, and S400. The specific content of each step is as follows.

S[100] Generate a Text Pattern Library

Semantic parsing is performed on the payload of each data packet in normal traffic to obtain a plurality of parsed texts, and the parsed texts are classified according to a specified format. The features of each type of text are learned, including a sequence of keywords and a value range of each keyword, and different text features are aggregated to generate the text pattern library, wherein the text pattern library may also be customized, for example, designed directly by the programmer.

S[100] includes the following steps.

S[110] collect normal traffic and preprocess it. A method of collecting the normal traffic includes, but is not limited to, collecting in a closed environment as well as labeling after collection in an open environment. Then, the traffic is parsed to single packets, where the data packet without payload is filtered according to the length field in network layer header of the data packet. If the data packet has a payload, S[120] is performed for further processing; otherwise, a next data packet of the normal traffic is processed to continue to determine whether the data packet has the payload or not.

S[120]: extract the payload of the data packet, and then perform the semantic parsing on the payload according to key fields to obtain the parsed text. If necessary, decompression and format conversion are performed on the data packet.

For example, a URL cannot contain a non-American Standard Code for Information Interchange (ASCII) character, when content that cannot be represented by ASCII codes, the non-ASCII character in the URL would be converted into the ASCII character. An adopted rule is that: the non-ASCII character is converted into a code bit in Unicode according to a certain encoding mode (typically, UTF-8), and then an encoded character string is formed through utilization of hexadecimal value corresponding to the code bit plus % prefix. The corresponding non-ASCII character string in the URL is replaced by the character string, and for such a URL, and the format conversion needs to be performed before processing is performed.

In the case of an HTTP packet, the key fields are derived from fields specified by the HTTP protocol, for example, HOST, GET, cookie, User-Agent, Origin, and the like, and the parsed text begins with a key field and ends with "\r\n".

For example, for the following HTTP message
GET
/player_auth?data=d1ff06c5adce6daee3264fbedebc904-
  ddal9ef6035ffbf5ed29973445940f34de80e06cba65b-
  bfaffedfb7af8d8d7c0ef39994elcifefaefl6d37285ec-
  9bea7dec5 e44326a61069ea26c6d5cba7dc75f HTTP/
  1.1
Host: wf1.394225.com:8855
Cdn-Src-Ip: 61.166.74.129
User-Agent: Mozilla/5.0 (Windows NT 6.1; WOW64) AppleWebKit/537.36 (KHTML, like Gecko) Chrome/55.0.2883.87 Safari/537.36
Origin: http://www.wf5558.com
Accept: */*
Referer: http://www.wf5558.com/
Accept-Language: zh-CN,zh;q=0.8
Accept-Encoding: gzip
X-Via: 1.1 erdianxin12:10 (Cdn Cache Server V2.0)
Connection: keep-alive
Cookie: io=Mehilvc_LHaXUav4AAAS
It may be parsed into 12 parsed texts as follows:
(1)GET
/player_auth?data=d1ff06c5adce6daee3264fbedebc904-
  ddal9ef6035ffbf5ed29973445940f34de80e06cba65b-
  bbfaffedfb7af8d8d7c0ef39994elcifefaefl6d37285ec-
  9bea7dec5 e44326a61069ea26c6d5cba7dc75f HTTP/
  1.1
(2)Host: wf1.394225.com:8855
(3)Cdn-Src-Ip: 61.166.74.129
(4)User-Agent: Mozilla/5.0 (Windows NT 6.1; WOW64) AppleWebKit/537.36 (KHTML, like Gecko) Chrome/55.0.2883.87 Safari/537.36
(5)Origin: http://www.wf5558.com
(6)Accept: */*
(7)Referer: http://www.wf5558.com/
(8)Accept-Language: zh-CN,zh;q=0.8
(9)Accept-Encoding: gzip
(10)X-Via: 1.1 erdianxin12:10 (Cdn Cache Server V2.0)
(11)Connection: keep-alive
(12)Cookie: io=Mehilvc_LHaXUav4AAAS The parsed text is observed to determine whether to perform further decomposition. For example, a format of the URL is protocol://hostname[: port]/path/[; parameters][?query]#fragment, where the symbol "?" identifies that a followed string is a query, the format of the query is field=value, a query string is separated by "&" and "=" sequentially to obtain corresponding keywords, and for example, for the query "?EIO=3&transport= polling&t= MEHG-Fo&sid=BRBOevtVU7wsYymWAAAS" in the URL, through utilization of the method, the corresponding keywords {EIO, transport, t, sid} and their values may be obtained. In addition to the URL, the keywords may also be obtained from other parts of an HTTP header, for example, cookies, and the like.

For example, the parsed text POST
/players/8/?EIO=3&transport=polling&t=MEvFx_
  q&sid=K7wWaFvPa4s3dYLAACp k HTTP/1.1 may
  be further decomposed through the keywords transport,
  t, sid, and the like, and the text is decomposed into six
  short texts as follows:
(1)POST/players/8/;
(2)EIO=3;
(3)transport=polling;
(4)t=MEvFx_q;
(5)sid=K7wWaFvPa4s3dYLAACpk;
(6)HTTP/1.1.

S[130]:Classify the large number of parsed texts obtained in S[110] and S[120] according to specified rules. The classification rules can be but not limited to web page URL or payload keywords; Each type of parsed text is trained to obtain the value range of each keyword and the sequence of keywords. The value range includes text character type range and text length range. The sequence of keywords refers to a structural format of the parsed text.

For example, the texts containing a cookie field in requests to access the same URL are classified into one type, the texts containing a sid field are classified into the other type, and the texts containing a t field are classified into another type.

For example, the value range types of the example cookie in S[120] include letter, number, and special character, with the length being 20. The text character types of the example sid only include the letter and the number, wherein the letter involves upper and lower case, and the text length is 20. The text character types of the example t include the letter and _, does not contain the number, and the text length is 7.

For example, the text content of the field Content-Type includes Content-Type: application/json; charset=utf-8, or Content-Type: text/plain; charset=UTF-8. As can be seen from the two given examples, the structure sequence of the parsed text of the Content-Type field can be expressed as "Content-Type: string 1/string 2; string 3=string 4". Wherein, the string 1 has two values: application and text, the string 2 also has two values: json and plain, and the application and json occur in pairs. Here are just two examples, and when there are more examples, the values of the string may be more.

S[140] the value range of each keywords and the sequence of keywords of all the parsed texts obtained in S[130] are aggregated to generate a text feature library, and the text features in the text feature library are converted into text patterns one by one to generate the text pattern library.

For example, regular expression is one of the text patterns. The text feature structure of the above cookie field may be expressed in the regular expression as Cookie: io=[-0-9a-zA-Z_]{20}. The text feature structure containing the t field may be expressed by the regular expression as t=[-a-zA-Z_]{7}.

S[200] Perform Semantic Parsing on Traffic Content

The Network Interface Card (NIC) receives a data packet, parses the header of the data packet, filters the data packet without payload according to the length field, performs semantic parsing on the data packet with payload, and performs operations, for example, decompression, format conversion, etc. on the data packet if necessary.

S[200] includes the following steps.

S[210]: After receiving a data packet, the NIC parses the header of the data packet and determines whether containing a payload according to the length field of the packet header, and if containing the payload, S[220] is performed. The data packet without payload is determined and processed according to the acknowledged rules, and this disclosure does not discuss this part of the function.

S[220]: extract the payload of the data packet, the semantic parsing is performed on the payload, and the operations, for example, the format conversion, the decompression, etc. are performed on the data packet if necessary.

S[300] matches with the content lock firewall and performs the forwarding or interception operation.

The content lock firewall performs checking to match the text pattern library obtained in S[100] and the parsed texts obtained in S[200], forwards the data packet if the character type, length range, structure sequence, and the like of all the texts are correctly matched with the text pattern library. Otherwise, the content lock firewall intercepts the data packet and writes the data packet to the interception log, and then returns to S[200]. A counter may be used to count the intercepted data packet, and when the counter exceeds a threshold, early warning is triggered to prompt an administrator to view the interception log. S[300] includes the following steps.

S[310]: the text pattern library obtained in S[100] is matched with the parsed texts obtained in S[200], a matching range including character type, text length, structure sequence, and the like.

S[320]: if all the texts of one data packet payload may be correctly matched with the text pattern library, the data packet is considered to be valid, the data packet is thereby forwarded, and then go back to S[210] to continue. If the data packet cannot be completely matched, the data packet is intercepted, and the intercepted data packet is written into a log, where the number of the intercepted packets is cumulatively counted by the counter, and then go back to S[210] to continue. The warning is triggered to prompt an administrator to view the interception log when the counter exceeds a set threshold, and then the counter is reset.

S[400] Recheck the Log and Update the Text Pattern Library on Demand

The administrator views the interception log in background and rechecks the data packet intercepted in S[320]. If the data packet belongs to normal access and was intercepted, the data packet payload would be trained, and the obtained text features are appended to the text pattern library. S[400] includes the following steps.

S[410]: the administrator rechecks the interception log in background, rechecks the intercepted data packet, and checks the payload content of the data packet. If the data packet belonging to the normal range is intercepted, a text pattern for the data packet would be generated according to the process from S[120] to S[140], and a new text pattern is appended to the text pattern library to update. There are two modes for triggering the viewing of the interception log, one being the counter triggering in S[320], the other being to view at a fixed interval time, and the granularity of interval time may be adjusted according to the amount of wrong interceptions.

Figure 2:
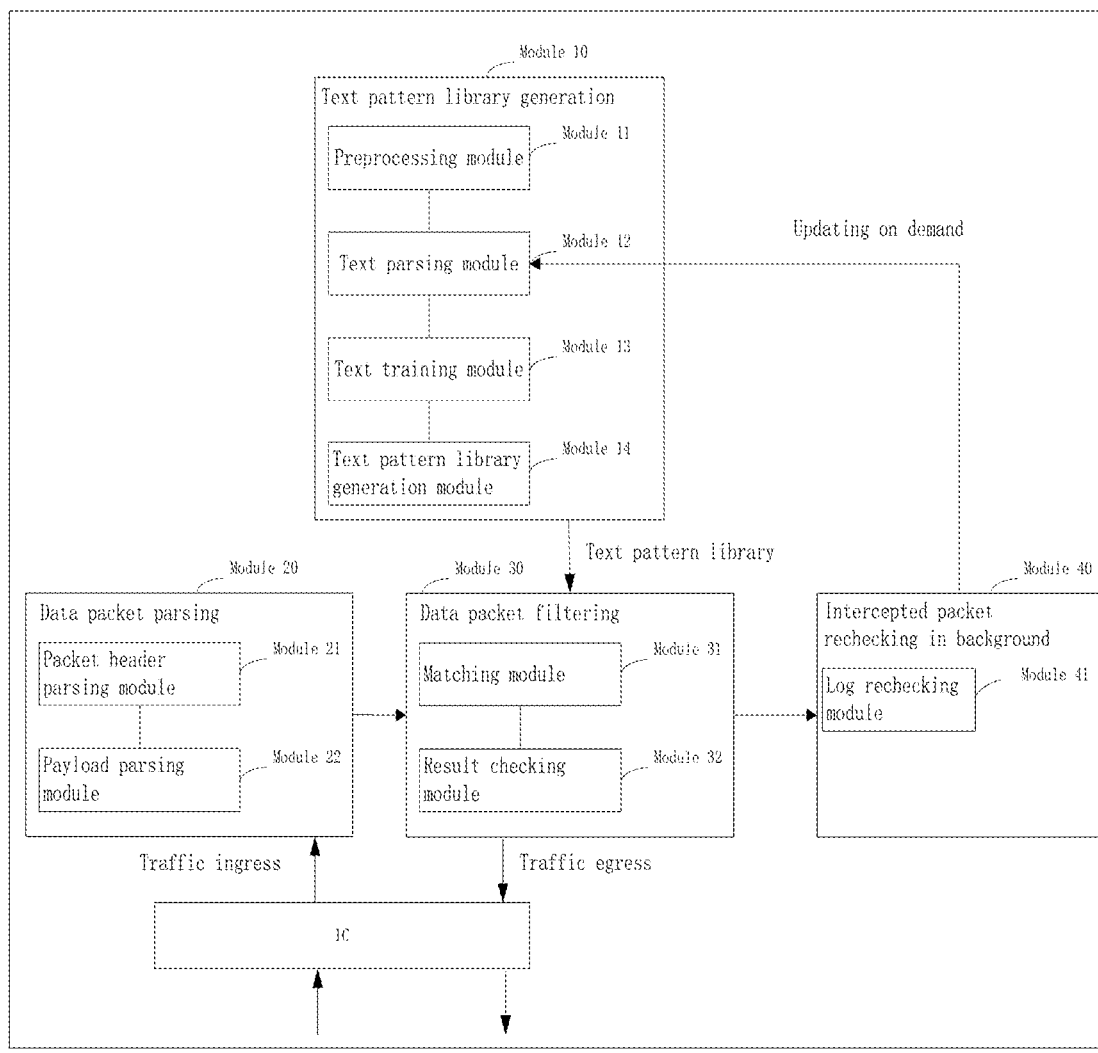
FIG. 2 shows a system block diagram of one embodiment according to the present disclosure.

FIG. 2 shows a system embodiment for implementing the data packet filtering method based on content lock of a white list, including modules 10, 20, 30, and 40 which are introduced as follows.

Module 10: a text pattern library generation module, which is used for preprocessing normal traffic, processing the traffic into single data packets, and filtering data packets without a payload according to length field of the header of the data packet header. Semantic parsing is then performed on the payload of each data packet in the normal traffic to obtain parsed texts, and then to classify them according to a specified form. The features of each type of texts are trained, which include the value range of each keywords and the sequence of keywords, and the like. All the text features are combined to generate the text pattern library, and the text pattern library may also be directly set by website content designers. The module 10 further includes modules 11, 12, 13, and 14.

Module 11: parse the normal traffic into single data packets, the data packets without the payload are filtered out according to the length field of the data packet header, and then the data packet with payload is sent to the module 12 for further processing.

Module 12: extract the payloads of the data packets obtained by the module 11, and perform the semantic parsing on the payloads according to key fields to obtain the parsed texts. If necessary, operations, such as decompression, format conversion, and the like are performed on the data packets. For example, in the case of an HTTP data packet, for the key fields derived from the fields specified by an HTTP protocol, such as HOST, GET, cookie, User-Agent, Origin, and the like, checking these parsed texts obtained through preliminary parsing to determine whether they can be further parsed, for example, the parsed texts POST/players/8/?EIO=3&transport=polling&t=MEvFx_q&sid=K7w-WaFvPa4s3dYLAACp k HTTP/1.1 may be further decomposed through the keywords, such as transport, t, sid, and the like, into six short texts as follows: (1) POST/players/8/; (2)EIO=3; (3)transport=polling; (4)t=MEvFx_q; (5)sid=K7wWaFvPa4s3dYLAACpk; (6)HTTP/1.1.

Module 13: classify a large number of parsed texts obtained in the S[11] and S[12], with classification rules, which may include, but not limited to, web page URLs or valid payload keywords. Each type of parsed texts is trained to obtain the value range of each keyword and the sequence of keywords of the parsed texts. The value ranges include text character type range and text length range. The sequence of keywords, also called the structure sequence, refers to the structural forms of the parsed texts.

For example, the texts which access the same URL and contains the keyword sid may be classified into one type, the text content of the keyword sid is composed of number and letter with fixed length 20.

Module 14: aggregate the value range of each keyword and the sequence of keywords of all the parsed texts obtained by the module 13 to generate the text feature library, and the text features in the text feature library are converted into text patterns one by one to generate the text pattern library.

For example, a regular expression is treated as a text pattern, for example, the text feature of sid may be represented by the regular expression as sid=[-0-9a-zA-Z_]{20}.

Module 20: a data packet parsing module, which is used for parsing and filtering the data packets. This module processes the data packets received by network interface card, filters the data packets without payload first according to the data packet header, then performs the semantic parsing on the data packets with payload, and performs operations, such as format conversion, decompression, and the like if necessary, to obtain the texts that can be identified in the text pattern library. The module 20 further includes modules 21 and 22.

Module 21: parse the packet header of the data packets, and filter the data packets without payload according to the length field of the data packet header, by the similar method as the module 11, to obtain the data packets with payload.

Module 22: extract the payload of the data packet obtained by the module 21, and perform the semantic parsing on payloads according to the key fields to obtain the parsed texts. If necessary, operations, such as decompression, format conversion, and the like may be performed on the data packets.

Module 30: a data packet filtering module, which is used for matching the text pattern library obtained by the module 10 with the parsed texts obtained by the module 20. The matching ranges includes text character type, text length, structure sequence, and the like, and then matching results are checked. If all matches pass, the data packets are forwarded through the network interface card, otherwise, the data packets are intercepted and written into an interception log, and a counter is used to cumulatively count the intercepted data packets. Early warning will be triggered to prompt an administrator to check the interception log once the number of accumulated intercepted data packets exceeds the set threshold, and then the counter will be reset. The module 30 further includes modules 31 and 32.

Module 31: match the text pattern library obtained by the module 10 with all the parsed texts obtained by the module 20, and the matching ranges include character type, text length, structure sequence, and the like.

Module 32: check the matching result of the module 31, and if all parsed texts are matched with the text pattern library, forward the data packets and return to the module 21 for checking the next data packet, and if the parsed texts are not matched with the text pattern library completely, intercept the data packet, record the intercepted data packet into the interception log, count the intercepted data packet with the counter. If the counter exceeds the set threshold, early warning will be triggered to prompt the administrator to check the interception log, reset the counter, and return to the module 21 to check the next data packet.

Module 40: an intercepted packet rechecking in background module, which is used for rechecking the intercepted data packet, preventing a normal website access data packet from being intercepted by the module 32, checking them according to the field content of the data packet payload. If normal data packets are intercepted, appending the text feature of the data packets to the text pattern library obtained in the module 12. The module 40 further comprises the module 41.

Module 41: a log rechecking module, which is used for the administrator viewing the interception log and checking the content of the intercepted data packet payload. If a normal data packet is intercepted, it will be sent to the module 12 for further processing, and the text features of the data packet are appended to the text pattern library. There are two modes of triggering the viewing of the interception log, one is the counter in the module 32, the other is viewing at a fixed interval, and the granularity of viewing interval can be adjusted according to the amount of wrong interceptions.

It is to be understood that the steps described in the above embodiments are not all necessary, and those skilled in the art may make appropriate alternatives, substitutions, modifications, and the like according to practical requirements.

Finally, it is to be noted that the above embodiments are only intended to explain rather than limit the technical solutions of the present disclosure. Although the present disclosure has been described above in detail with reference to the embodiments, those of ordinary skill in the art will understand that various modifications or equivalents to the technical solutions of the present disclosure do not depart from the spirit and scope of the present disclosure and should be covered in the scope of the claims of the present disclosure.

What is claimed is:

1. A content lock firewall method based on a white list, the method comprising:
    performing semantic parsing on a payload of a data packet received by a website to obtain parsed texts of the received data packet, the parsed texts including a sequence of keywords and a value range of each keyword; and
    matching the parsed texts of the data packet received by the website with a text pattern library as the white list to decide whether to forward or intercept the received data packet, the text pattern library comprising a plurality of text patterns, and each text pattern includes a sequence of keywords and a value range of each keyword;
    and wherein the text pattern library is generated by:
    performing semantic parsing on the payload of each data packet from the existing normal traffic of the website, and training with the parsed texts to obtain the sequence of keywords and the value range of each keyword;
    wherein matching the parsed texts of the data packet received by the website with a text pattern library to decide whether to forward or intercept the received data packet further comprises:
    matching the value range of each keyword and the sequence of keywords of all the parsed texts from the received data packets with the text pattern library one by one, wherein if the parsed text is correctly matched, then the matching succeeds, and otherwise, the matching fails;
    if the matching succeeds, forwarding the received data packet; and
    if the matching fails, intercepting the received data packet, and writing the received data packet to an interception log.

2. The method of claim 1, wherein the text pattern library is generated further by:
    preprocessing normal traffic;
    parsing the payload according to the keywords to obtain the parsed text;
    classifying a large number of obtained parsed texts according to specific rules, the classification rules including web page Universal Resource Locators (URLs) and valid payload keywords, and training with each class of the parsed text to obtain a value range of each keyword and a sequence of keywords of the parsed text; and aggregating the value range of each keyword and the sequence of keywords of all the parsed texts to generate a text feature library, and converting the text features in the text feature library into text patterns one by one to generate the text pattern library.

3. The method of claim 1, further comprising:
rechecking the interception log, wherein the interception log is rechecked through counter triggering or at fixed time interval.

4. The method of claim 3, wherein rechecking the interception log, wherein the interception log is rechecked through counter triggering or at fixed time interval comprises:
for the data packet which belongs to normal access but being intercepted, parsing the payload of the intercepted data packet to obtain the value range of each keyword and the sequence of keywords, and appending the obtained text features to the text pattern library.

5. The method claim 3, wherein the counter triggering comprises:
using a counter to cumulatively count the number of the intercepted packets;
when the counter exceeds a set threshold, triggering a warning prompt to view the interception log; and
resetting the counter.

6. A computer-readable non-transitory storage medium having a computer program code stored therein that when executed, causes a processor to operate a content lock firewall based on a white list, the processor to:
perform semantic parsing on a payload of a data packet received by a website to obtain parsed texts of the received data packet, the parsed texts including a sequence of keywords and a value range of each keyword; and
match the parsed texts of the data packet received by the website with a text pattern library as the white list to decide whether to forward or intercept the received data packet, the text pattern library comprising a plurality of text patterns, and each text pattern includes a sequence of keywords and a value range of each keyword; and
wherein to generate the text pattern library, the processor is to:
perform semantic parsing on the payload of each data packet from the existing normal traffic of the website, and training with the parsed texts to obtain the sequence of keywords and the value range of each keyword;
wherein to match the parsed texts of the data packet received by the website with a text pattern library to decide whether to forward or intercept the received data packet, the processor is further to:
match the value range of each keyword and the sequence of keywords of all the parsed texts from the received data packets with the text pattern library one by one, wherein if the parsed text is correctly matched, then the matching succeeds, and otherwise, the matching fails;
if the matching succeeds, forward the received data packet; and
if the matching fails, intercept the received data packet, and writing the received data packet to an interception log.

7. A computing system, comprising:
a storage device for storing a computer program code;
a processor, communicatively coupled to the storage device, to operate a content lock firewall based on a white list to:
perform semantic parsing on the payload of the data packet received by a website to obtain parsed texts of the received data packet, the parsed texts including a sequence of keywords and a value range of each keyword; and
match the parsed texts of the data packet received by the website with a text pattern library as the white list to decide whether to forward or intercept the received data packet, the text pattern library comprising a plurality of text patterns, and each text pattern includes a sequence of keywords and a value range of each keyword;
and wherein to generate the text pattern library, the processor is to:
perform semantic parsing on the payload of each data packet from the existing normal traffic of the website, and training with the parsed texts to obtain the sequence of keywords and the value range of each keyword;
wherein to match the parsed texts of the data packet received by the website with a text pattern library to decide whether to forward or intercept the received data packet, the processor is further to:
match the value range of each keyword and the sequence of keywords of all the parsed texts from the received data packets with the text pattern library one by one, wherein if the parsed text is correctly matched, then the matching succeeds, and otherwise, the matching fails;
if the matching succeeds, forward the received data packet; and
if the matching fails, intercept the received data packet, and writing the received data packet to an interception log.

8. The computing system of claim 7, wherein to generate the text pattern library, the processor is further to:
preprocess normal traffic;
parse the payload according to the keywords to obtain the parsed text;
classify a large number of obtained parsed texts according to specific rules, the classification rules including web page URLs and valid payload keywords, and training with each class of the parsed text to obtain a value range of each keyword and a sequence of keywords of the parsed text; and
aggregate the value range of each keyword and the sequence of keywords of all the parsed texts to generate a text feature library, and converting the text features in the text feature library into text patterns one by one to generate the text pattern library.

9. The computing system of claim 7, wherein the processor is further to:
recheck the interception log, wherein the interception log is rechecked through counter triggering or at fixed time interval.

10. The computing system of claim 9, wherein to recheck the interception log, wherein the interception log is rechecked through counter triggering or at fixed time interval, the processor is further to:
for the data packet which belongs to normal access but being intercepted, parse the payload of the intercepted data packet to obtain the sequence of keywords and the value range of each keyword, and append the obtained text features to the text pattern library.

11. The computing system of claim 9, wherein the counter triggering comprises:
using a counter to cumulatively count the number of the intercepted packets;

when the counter exceeds a set threshold, triggering a warning prompt to view the interception log; and
resetting the counter.

\* \* \* \* \*